(12) United States Patent
Mukherjee et al.

(10) Patent No.: US 9,124,541 B2
(45) Date of Patent: Sep. 1, 2015

(54) ZERO COPY ACCELERATION FOR SESSION ORIENTED PROTOCOLS

(75) Inventors: Shrijeet Mukherjee, Fremont, CA (US); David S. Feldman, McMinnville, OR (US); Michael B. Galles, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1002 days.

(21) Appl. No.: 13/172,986

(22) Filed: Jun. 30, 2011

(65) Prior Publication Data

US 2013/0007296 A1 Jan. 3, 2013

(51) Int. Cl.
*H04L 12/861* (2013.01)
*H04L 29/06* (2006.01)

(52) U.S. Cl.
CPC ............ *H04L 49/9057* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,157,955 A * | 12/2000 | Narad et al. | .................. | 709/228 |
| 6,246,683 B1 * | 6/2001 | Connery et al. | .............. | 370/392 |
| 6,832,261 B1 * | 12/2004 | Westbrook et al. | ............ | 709/236 |
| 6,876,657 B1 * | 4/2005 | Palmer et al. | ................. | 370/394 |
| 7,752,360 B2 | 7/2010 | Galles | | |
| 8,391,302 B1 * | 3/2013 | Kommidi et al. | ............. | 370/401 |
| 2003/0026277 A1 * | 2/2003 | Pate et al. | ...................... | 370/412 |
| 2004/0013117 A1 * | 1/2004 | Hendel et al. | ................. | 370/394 |
| 2004/0057434 A1 * | 3/2004 | Poon et al. | ..................... | 370/392 |
| 2005/0223128 A1 * | 10/2005 | Vasudevan et al. | ............. | 710/22 |
| 2006/0072564 A1 * | 4/2006 | Cornett et al. | ................ | 370/389 |
| 2008/0080514 A1 * | 4/2008 | Louzoun et al. | .............. | 370/394 |
| 2008/0126622 A1 * | 5/2008 | Tamir et al. | ...................... | 710/52 |
| 2008/0130894 A1 * | 6/2008 | Qj et al. | ......................... | 380/277 |
| 2009/0248891 A1 * | 10/2009 | Tanaka | .......................... | 709/234 |
| 2011/0153771 A1 * | 6/2011 | Lin et al. | ....................... | 709/212 |
| 2012/0173772 A1 * | 7/2012 | Durand et al. | .................. | 710/22 |

OTHER PUBLICATIONS

Cisco Data Sheet, Cisco UCS M81KR Virtual Interface Card, 2010 (4 pages).

* cited by examiner

*Primary Examiner* — Scott B Christensen
*Assistant Examiner* — Sean Concannon
(74) *Attorney, Agent, or Firm* — Edell, Shapiro & Finnan, LLC

(57) ABSTRACT

Techniques are provided for zero copy accelerated processing of packets received at a network device according to a session oriented protocol. Each packet comprises a header field and a payload field. Data in the header field of a byte is evaluated to determine whether a sequence number in the header field is equal to an expected sequence number for a given flow of packets. When the sequence number in the header field is equal to the expected sequence number, header data from the header field is stored in a header ring comprising a plurality of socket buffers and payload data is directed to an application buffer pool according to a pointer in a streaming data ring. When the sequence number in the header field is not equal to the expected sequence number, the header data and the payload data are stored in the header ring.

24 Claims, 6 Drawing Sheets

ZERO COPY ACCELERATION FOR SESSION ORIENTED PROTOCOLS

TECHNICAL FIELD

The present disclosure relates to devices that process packets transmitted according to session oriented protocols.

BACKGROUND

Acceleration for session oriented protocols, such as the Transmission Control Protocol (TCP), requires an offload engine that is essentially a computer on the network interface card to offload the computing operations that would otherwise be required by the host device. The cost and performance benefits of an offload have been suspect at best. The offload engine copies packets to buffers at the application layer and that in turn requires every packet to be subjected to read and write operations. Copying the payload of packets to the application buffer utilizes the central processing unit. Higher central processing unit utilization is undesirable because it eventually results in lower throughput, limiting the availability of the central processing unit to application layer operations.

DESCRIPTION OF EXAMPLE EMBODIMENTS

Overview

Techniques are provided for zero copy accelerated processing of packets received at a network device according to a session oriented protocol. Each packet comprises a header field and a payload field. Data in the header field of a packet is evaluated to determine whether a sequence number in the header field is equal to an expected sequence number for a given flow of packets. When the sequence number in the header field is equal to the expected sequence number, header data from the header field is stored in a header ring comprising a plurality of socket buffers and payload data is directed to an application buffer pool according to a pointer in a streaming data ring. When the sequence number in the header field is not equal to the expected sequence number, the header data and the payload data are stored in the header ring.

Example Embodiments

Figure 1:
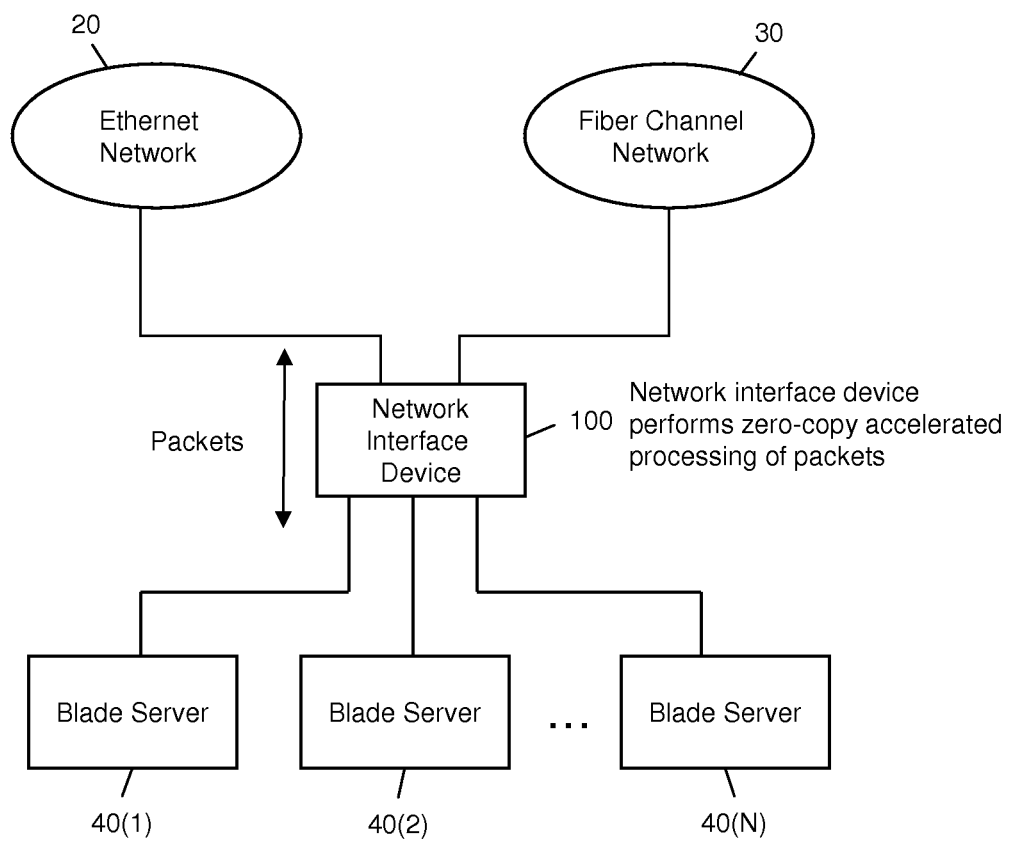
FIG. 1 is a block diagram showing an example of a network environment in which a network interface is configured to perform zero copy accelerated processing of packets received according to a session oriented protocol.

Referring first to FIG. 1, a networking environment 10 is shown comprising an Ethernet network 20, a Fiber Channel network 30, a plurality of blade servers 40(1)-40(N) and a network interface device 100. The network interface device 100 interfaces packets between the blade servers and the Ethernet network 20 and Fiber Channel network 30. According to the techniques described herein, the network interface device 100 is configured to perform zero copying accelerated processing of packets that are communicated according to a session oriented protocol, e.g., the Transmission Control Protocol (TCP) between the blade servers 40(1)-40(N) and the Ethernet network 20 or Fiber Channel network 30. As is known in the art, packets sent using a session protocol comprise a header field (H) and payload field (P). The payload field of a packet may comprise one or more bytes that is a multiple bit value.

Figure 2:
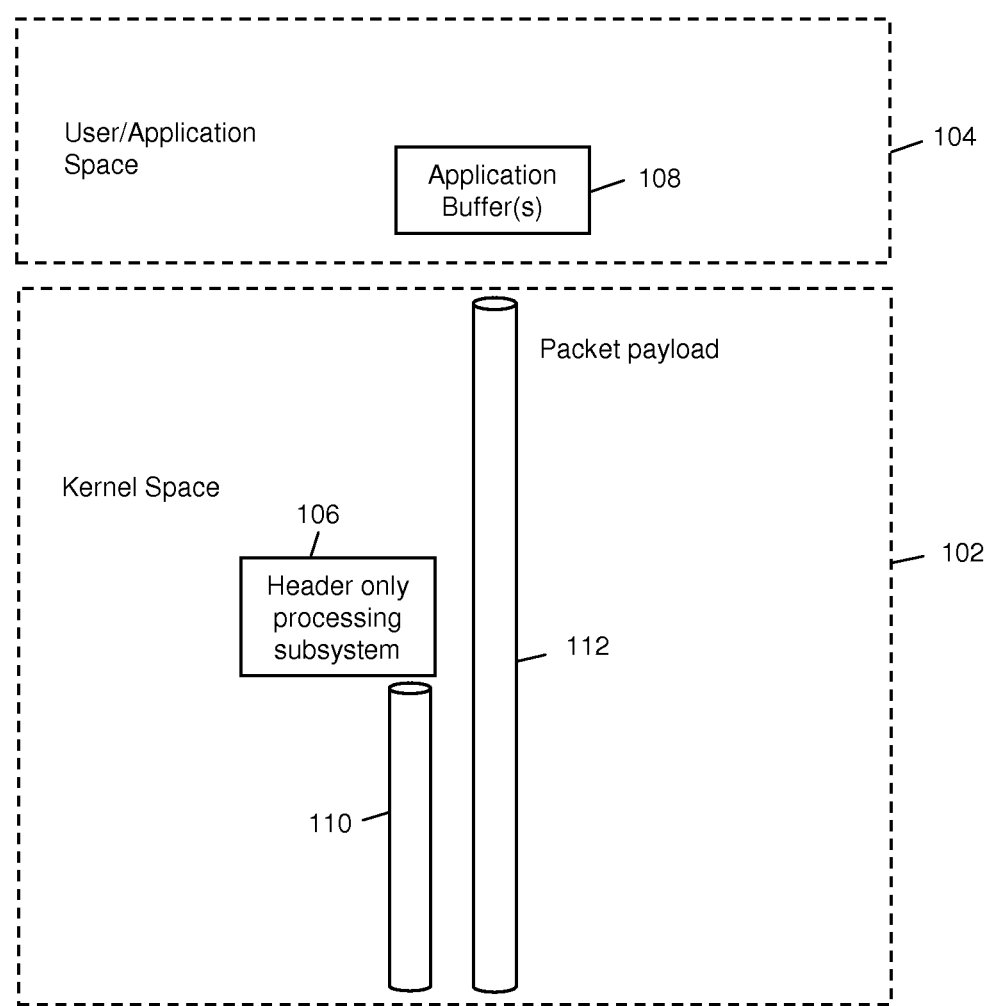
FIG. 2 is a diagram generally depicting operations of the zero copying accelerated processing of packets performed by the network interface device.

Reference is now made to FIG. 2. FIG. 2 shows the network stack for a receive path in the network interface device 100. There is a kernel space or domain 102 in the network interface device 100 and a user/application space or domain 104. According to the techniques described herein, a header-only processing subsystem 106 is provided in the kernel space and an application buffer pool 108 is provided in the user/application space 104. When packets are received in proper sequence, hardware in the network interface device 100 sends header data of received packets along path 110 to the header-only processing subsystem 106 and sends the payload data of the received packets along path 112 to the application buffer pool 108. Thus, the kernel space 102 maintains buffers for the header only. Payload data is presented in a contiguous streamed manner to the application buffer pool 108.

Figure 3:
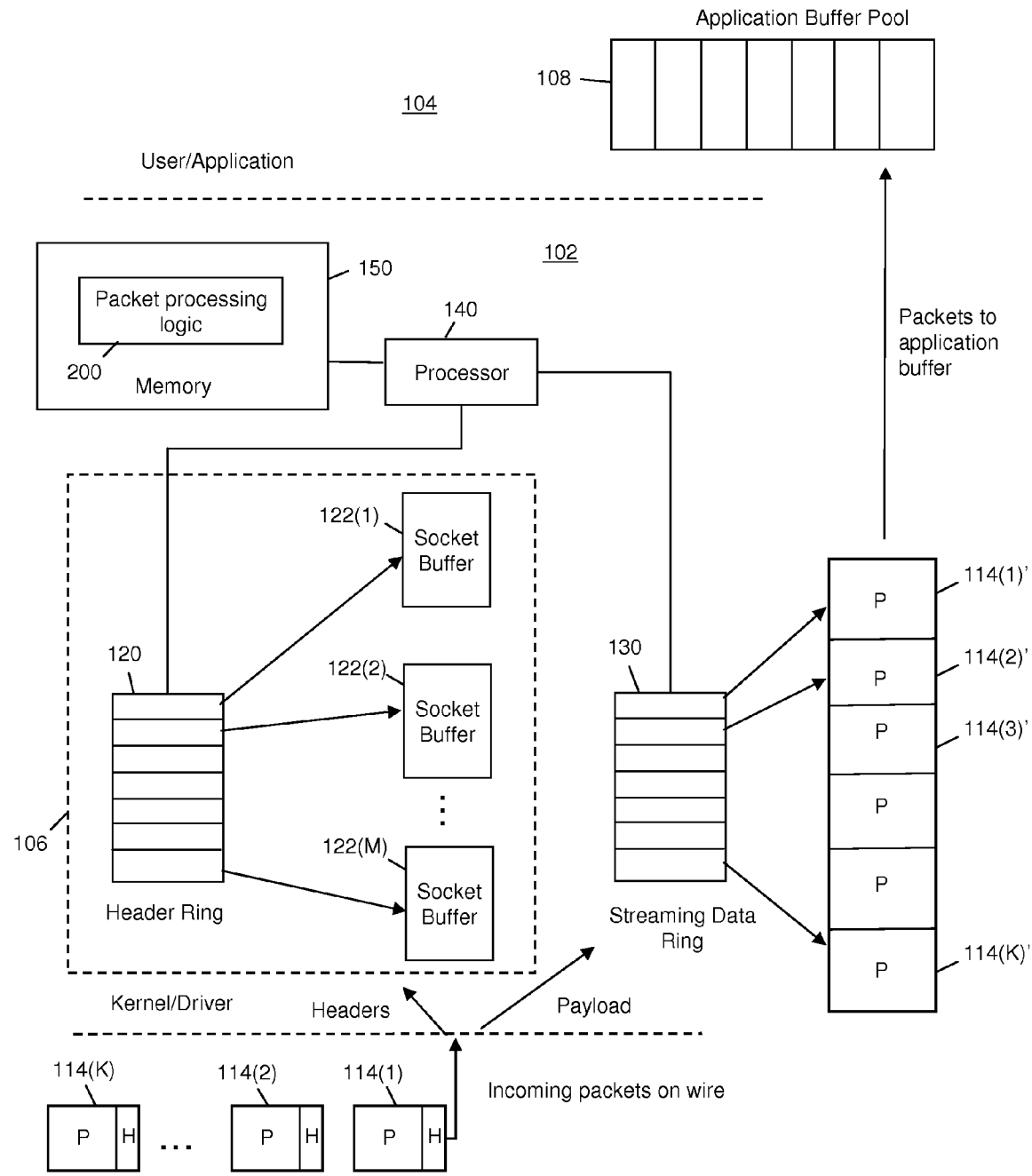
FIG. 3 is a block diagram illustrating an example of the components in the network interface device configured to perform the zero copy accelerated processing of packets.

Reference is now made to FIG. 3 that shows the components in the kernel space 102 in greater detail. Incoming packets are shown at 114(1)-114(K). The header processing subsystem 106 comprises a header ring 120 and a plurality of discrete socket buffers 122(1)-122(M). There is a streaming data ring 130 that comprises memory locations that store pointers to buffers in the application buffer pool 108 for corresponding ones of the packet payloads shown at 114(1)'-114(K)'. There is a header ring 120 and streaming data ring 130 for each of a plurality of packet flows that the network interface device 100 is configured to simultaneously handle. The header ring 120 and streaming data ring are circular buffers, for example. A circular buffer is a memory device (e.g., arrangement or registers or storage locations) configured with a data structure that uses a single, fixed-size buffer as if it were connected end-to-end. The rings 120 and 130 may also be referred to as buffers.

The header of each packet is stored in one of the socket buffers 122(1)-122(M). The payload of each packet is appended to the streaming data ring 130. Pointers stored in locations of the streaming data 130 point to buffers in the application buffer pool 108.

A processor 140, e.g., microprocessor or microcontroller, performs certain operations described herein by software stored in memory 150. For example, memory 150 stores instructions for packet processing logic 200. The operations of the packet processing logic 200 are described hereinafter in connection with FIG. 6.

The memory 150 may include read only memory (ROM), random access memory (RAM), magnetic disk storage media devices, optical storage media devices, flash memory devices, electrical, optical, or other physical/tangible memory storage devices. In general, these memory devices may comprise one or more computer readable storage media encoded with software comprising computer executable instructions and when the software is executed, the processor that executes that software (e.g., processor 140) is operable to perform the operations described herein for the packet processing logic 200.

The network stack configuration shown in FIG. 3 is different from the conventional configuration in that the header and payload are not in the same socket buffer. In the conventional configuration, each packet (header and payload) consumes a discrete socket buffer. Also, in the conventional configuration, the application buffer pool is supplied with contiguous data by virtue of a copy operation. The copy operation uses read and write operations which have an associated utilization burden on the central processing unit. By contrast, in the configuration shown in FIG. 3, each socket buffer contains header data only. The payload data is streamed in a contiguous manner into the application buffer pool through pointers stored in the streaming data ring. The payload data is appended to the streaming data ring.

The techniques described herein use a classifier that isolates flows into queues. The queues take streaming buffers, i.e., the streaming data ring, instead of traditional discrete buffers. A counter mechanism is used to check for byte offsets in a flow and to use that offset to land the bytes in the streaming data ring. Software analyzes the content of the header socket buffers to put header data in a separate queue from the payload data if the flow is well formed and otherwise to put the header data and payload data into a header socket buffer for processing if there is an out of sequence conditions or other packet errors. Using this scheme, software in the normal path (bytes that are not out of sequence) will only check the headers in the header queue to validate the bytes in the streaming data ring queue. The payload data is directed to the application buffer pool without being copied into and out of memory and thus avoiding the need for processor read and write operations.

Figure 4:
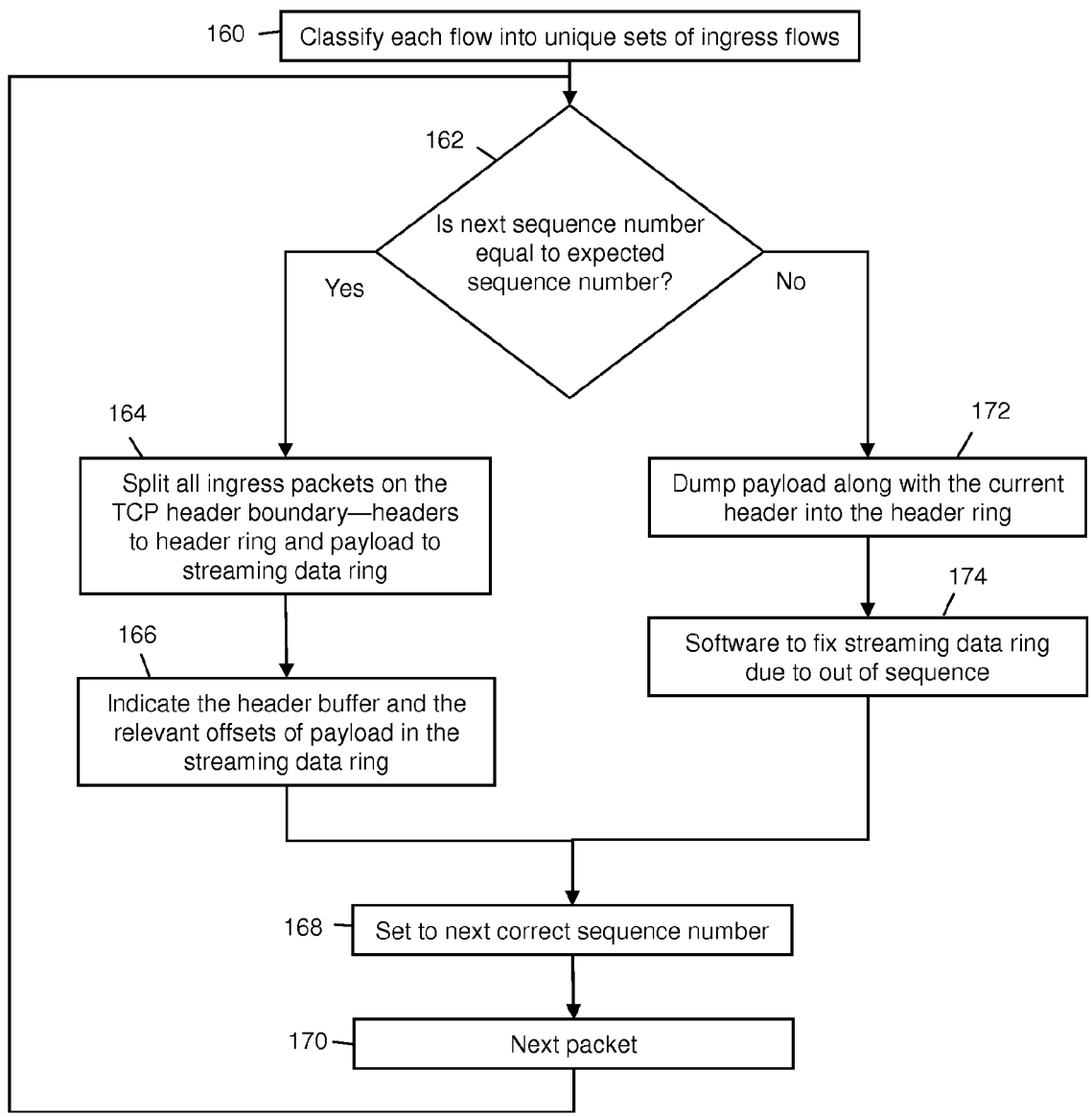
FIG. 4 is a flow chart depicting examples of operations of hardware components shown in FIG. 3 in the zero copy accelerated processing of packets.

Hardware control of the operation of the components shown in FIG. 3 is now described with respect to FIG. 4, with continued reference to FIG. 3. The hardware control is configured to ensure that only data with the correct sequence number is appended to the streaming data ring. At 160, each flow of packets is classified into unique sets of ingress flows. At 162, the header of a packet is evaluated to determine whether a sequence number in the header is equal to the expected sequence number. For example, in the case of TCP, the TCP sequence number and checksum of the header of a packet are examined. Only payload of a packet having a TCP sequence number that is equal to the next expected sequence number is appended to the streaming data ring. When the evaluation operation at 162 produces a positive ("yes") result, then processing proceeds to 164. At 164, all ingress packets are split on their header/payload boundary such that header data is sent to the header ring and payload data is sent to the streaming data ring. At 166, the header socket buffer and the relative offsets of payload referenced in the streaming data ring are indicated with an appropriate pointer in the header ring. At 168, the next correct sequence number is set for processing of the next packet as indicated at 170. Operation 168 could be performed by software, particularly when software operations were performed to fix the streaming data ring when an out of sequence condition is detected, as described below. After operation 168, the streaming data ring is re-enabled, e.g., by setting an enable bit on the streaming data ring.

When, at 162, it is determined that the sequence number of the packet is not equal to the expected sequence number, then processing of the packet proceeds to operation 172. At 172, instead of directing the payload data directly to the application buffer pool, the payload and the header of the packet are sent to the header ring placing the header and payload a socket buffer. At 174, software operations are performed to fix the streaming data ring due to an out of sequence packet. Processing then continues to 168 and 170 after operation 174. The software operations at 174 correspond to operations of the packet processing logic 200 referred to in connection with FIG. 2, and described hereinafter in connection with FIG. 6. The hardware operations may also be configured to remove/truncate any "pad" bits that have been added to an Ethernet frame to keep the packet to a standard Internet Protocol (IP) length. More specifically, the hardware may be configured to determine whether a packet is of a predetermined type of protocol (e.g., IP), and when it is determined that the packet is of the predetermined type of protocol, to truncate the packet to a standard length of the predetermined type of protocol.

Figure 5:
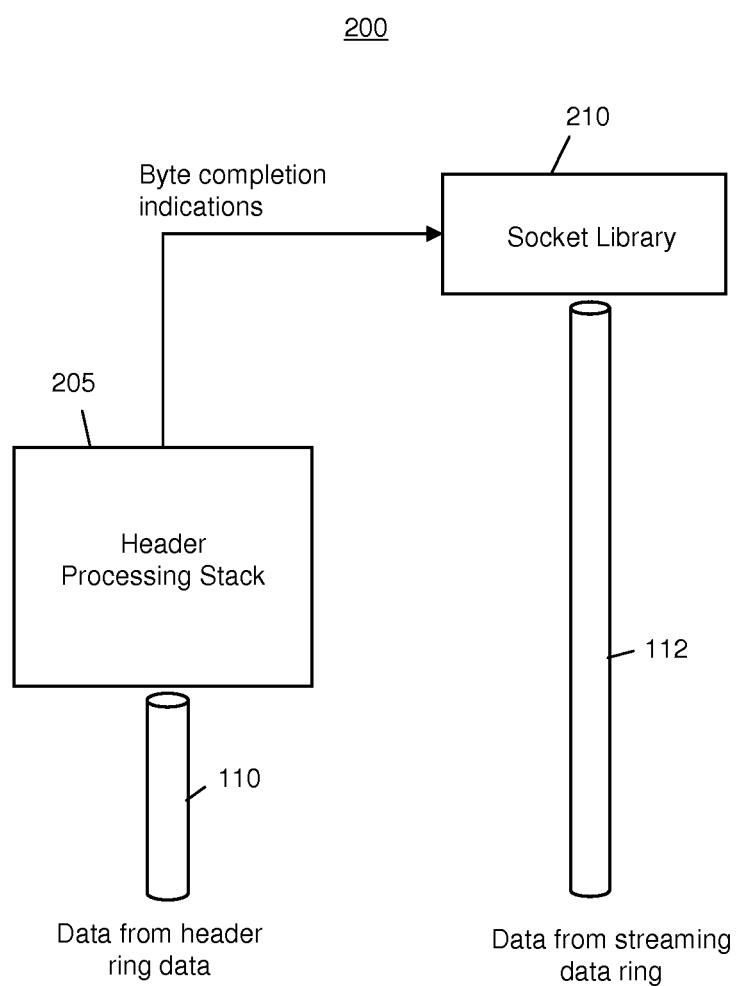
FIG. 5 is a diagram generally depicting the software components of the network interface device used in the zero copy accelerated processing of packets.

FIG. 5 generally depicts the functions of packet processing logic 200. There is a header processing stack 205 that performs processing of the header ring and socket buffers (shown in FIG. 2) from path 110. There is a socket library 210 that receives data from the streaming data ring on path 112. The header processing stack 205 processes header data (e.g. TCP/IP headers) and indicates to the socket library 210 those packets that have successfully completed processing. The socket library 210 links with the application and provides read/write functionality.

Figure 6:
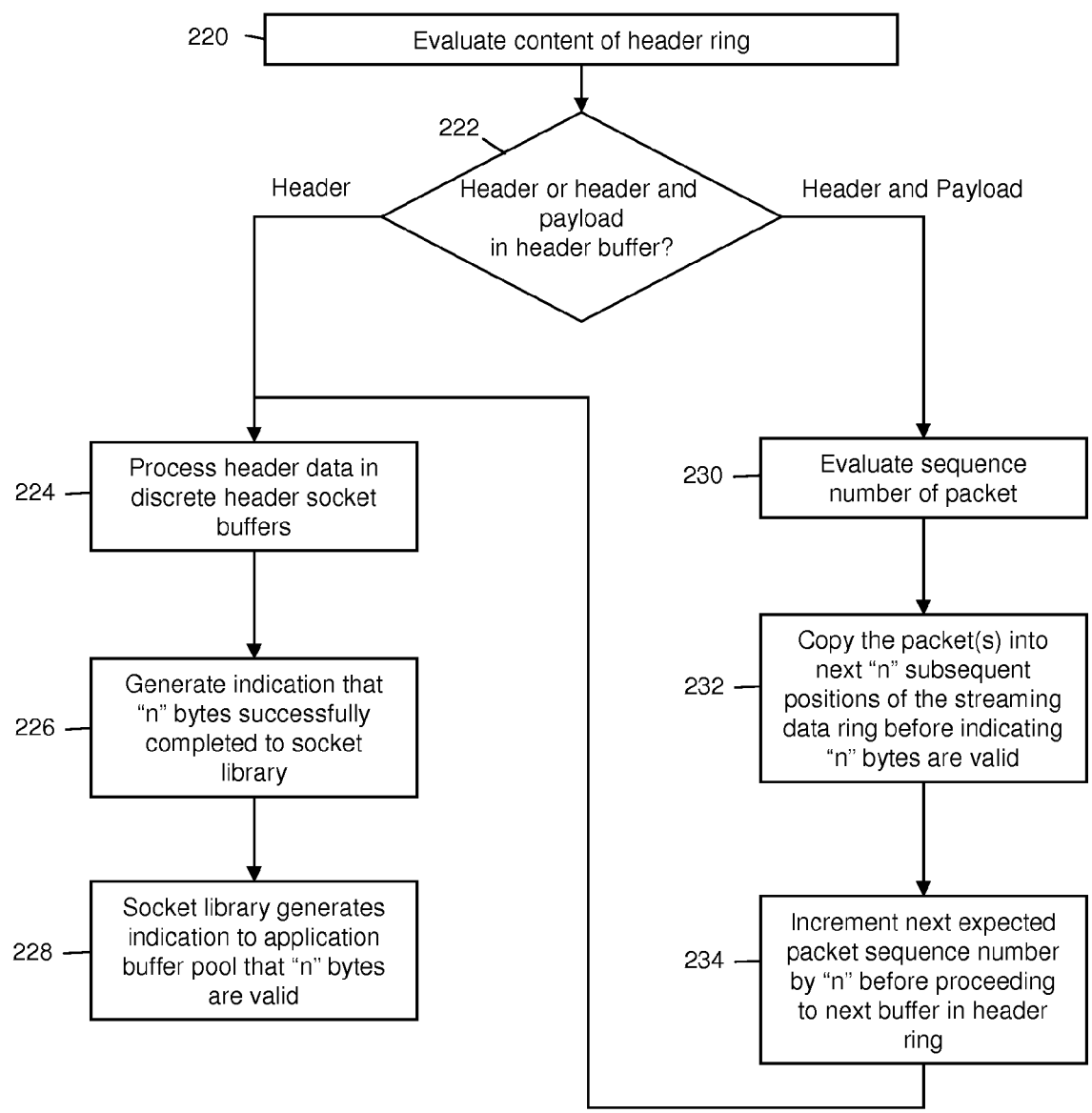
FIG. 6 is a flow chart depicting operations of the software components of the network interface device in the zero copy accelerated processing of packets.

Turning now to FIG. 6, the operations of the header processing stack 205 and socket library 210 are now described in more detail. At 220, the content of the header ring is evaluated. At 222, it is determined whether the header ring contains header data or header and payload data. When the header ring is determined to contain only header data, processing proceeds to the path on the left. At 224, the header data in the discrete header socket buffers are processed. At 226, an indication is generated that "n" bytes are successfully completed. At 228, the socket library generates an indication to the application buffer pool that "n" bytes are valid.

When, at 222, it is determined that there is header and payload data in the header ring, then processing proceeds along the path to the right in FIG. 6. Payload data is in the header ring only when it has been determined that the packet is out of sequence. In this path, software takes the payload in a header socket buffer and splices it into the streaming data ring. At 230, the sequence number of the packet is evaluated. At 232, when the sequence number determined at 230 does not match the expected sequence number, the out of sequence packet or packets are copied into the next "n" subsequent positions (byte positions) in the streaming data ring before indicating that "n" bytes are valid. By copying the out of sequence bytes into the next "n" bytes of the streaming data ring, these bytes are set aside until their place in the sequence is satisfied upon reception of further packets. At 234, the next expected packet sequence number is incremented by "n" before proceeding to the next socket buffer in the header ring. Thereafter, processing of the socket buffer proceeds at operation 224 as described above.

The following is an example of operations performed when two packets, Packet 1 and Packet 2, arrive out of order, i.e., Packet 2 arrives before Packet 1. Reference is made to FIG. 3 for purposes of this example. Since Packet 2 arrives before Packet 1, Packet 2 would be placed in the first header buffer (e.g., socket buffer 122(1)), and Packet 1 would be placed in the second header buffer (e.g., socket buffer 122(2)). The streaming data ring 130 would not have any data from either Packet 1 or Packet 2. When software (packet process logic 200) processes one TCP window worth of data, it will find Packet 2 first and store an indication ("remember") that Packet 2 is out of order and therefore search ahead for Packet 1 in the window. When the packet process logic 200 finds Packet 1, it will copy the payload for Packet 1 into the subsequent bytes of the streaming data ring 130. Then, the packet process logic 200 will go back to the "remembered" Packet 2 and copy its payload after the just copied payload of Packet 1. The packet process logic 200 will then increment the next expected sequence by packet_size (of Packet 1)+packet_size (of Packet 2) and proceed from that point.

The foregoing presents a packet processing approach that does not require a substantial number of digital logic gates for implementation and accelerates processing of packets communicated according to a session oriented protocol, such as TCP. An example of another session oriented protocol to which these techniques are useful is the Real-time Transport Protocol (RTP) running over the User Datagram Protocol (UDP). These packet processing techniques address the low latency high throughput problem associated with Data Center Ethernet clusters, and achieve closer to ideal performance in terms of throughput and CPU utilization.

Thus, in summary, a scheme is provided herein to perform zero copy offload of session packets without the need for a protocol engine. These techniques are inexpensive to implement and can be used to accelerate any session oriented protocol that uses sequence numbers that are packet offsets. Examples of uses for these techniques include accelerating TCP processing of packet; accelerating data movement in Internet Small Computer System Interface (iSCSI), an Internet Protocol (IP)-based storage networking standard for linking data storage facilities; direct memory access to user space for virtual machines; on-loading in Microsoft's so-called "Chimney" architecture; and any low-latency/high-message rate applications.

Accordingly, in one form, a method is provided comprising at a network device, receiving packets of data sent using a session oriented protocol, each packet comprising a header field and a payload field; evaluating data in the header field of a packet to determine whether a sequence number in the header field is equal to an expected sequence number for a given flow of packets; when the sequence number in the header field is equal to the expected sequence number, storing header data from the header field in a header ring comprising a plurality of socket buffers and directing payload data to an application buffer pool according to a pointer in a streaming data ring; and when the sequence number in the header field is not equal to the expected sequence number, storing the header data and the payload data in the header ring.

In another form, an apparatus is provided comprising a first ring buffer comprising a plurality of socket buffers; a second ring buffer; a buffer pool; and a processor. The processor is configured to evaluate data in a header field of packets of data received according to a session oriented protocol, to determine whether a sequence number in the header field is equal to an expected sequence number for a given flow of packets; when the sequence number in the header field is equal to the expected sequence number, store header data from the header field to one of the plurality of socket buffers of the first ring buffer and direct payload data to the buffer pool according to a pointer in the second ring buffer; and when the sequence number in the header field is determined to not be equal to the expected sequence number, store the header data and payload data in one of the plurality of socket buffers of the first ring buffer.

In yet another form, one or more computer readable storage media are provided that are encoded with software comprising computer executable instructions that when executed are operable to: at a network device, receive packets of data sent using a session oriented protocol, each packet comprising a header field and a payload field; evaluate data in the header field of a packet to determine whether a sequence number in the header field is equal to an expected sequence number for a given flow of packets; when the sequence number in the header field is equal to the expected sequence number, store header data from the header field in a header ring comprising a plurality of socket buffers and direct payload data to an application buffer pool according to a pointer in a streaming data ring; and when the sequence number in the header field is not equal to the expected sequence number, store the header data and the payload data in the header ring.

The above description is intended by way of example only.

What is claimed is:

1. A method comprising:
at a network device, receiving a plurality of packets of data, each packet comprising a header field and a payload field, wherein the plurality of packets of data includes at least one packet with a sequence number in the header field that is equal to an expected sequence number and at least one packet with a sequence number in the header field that is not equal to the expected sequence number;
evaluating data in the header field of a packet to determine whether the sequence number in the header field is equal to the expected sequence number for a given flow of packets;
based on the sequence number in the header field being equal to the expected sequence number,
storing only header data from the header field in at least one header ring comprising a plurality of discrete socket buffers,
directing only payload data in a contiguous streamed manner to an application buffer pool, and
storing, in at least one streaming data ring, pointers that point to buffers in the application buffer pool for corresponding payload data without copying the payload data in and out of memory in which the header data is stored; and
based on the sequence number in the header field being not equal to the expected sequence number, storing both the header data and the payload data in the at least one header ring.

2. The method of claim 1, and further comprising evaluating content of the at least one header ring to determine whether it contains header data or header data and payload data.

3. The method of claim 2, when it is determined that the at least one header ring contains only header data, further comprising processing the header data in the at least one header ring.

4. The method of claim 3, and further comprising generating an indication in the at least one header ring of the relative offsets of the payload data referenced in the at least one streaming data ring.

5. The method of claim 3, wherein processing the header data is performed for a plurality of received packets, and further comprising generating an indication to the application buffer pool that a plurality of bytes are valid.

6. The method of claim 2, when it is determined that the at least one header ring contains header data and payload data, further comprising copying one or more bytes that are determined to be out of sequence to subsequent positions in the at least one streaming data ring.

7. The method of claim 6, and further comprising incrementing a next expected packet sequence number by a predetermined amount before proceeding to evaluate a next socket buffer in the at least one header ring.

8. The method of claim 1, and further comprising determining whether a packet is of a predetermined type of protocol, and when it is determined that the packet is of the predetermined type of protocol, truncating the packet to a standard length of the predetermined type of protocol.

9. An apparatus comprising:
at least one first ring buffer comprising a plurality of socket buffers;
at least one second ring buffer;
a buffer pool;
a processor configured to:
receive a plurality of packets of data, each packet comprising a header field and a payload field, wherein the plurality of packets of data includes at least one packet with a sequence number in the header field that is equal to an expected sequence number and at least one packet with a sequence number in the header field that is not equal to the expected sequence number;
evaluate data in a header field of received packets to determine whether a sequence number in the header field is equal to an expected sequence number for a given flow of packets;
based on the sequence number in the header field being equal to the expected sequence number,
store only header data from the header field to one of the plurality of discrete socket buffers of the at least one first ring buffer,
direct only payload data in a contiguous streamed manner to the buffer pool, and
store, in the at least one second ring buffer, pointers that point to buffers in the buffer pool for corresponding payload data without copying the payload data in and out of memory in which the header data is stored; and
based on the sequence number in the header field being determined to not be equal to the expected sequence number, store both the header data and payload data in one of the plurality of socket buffers of the first ring buffer.

10. The apparatus of claim 9, wherein the processor is configured to evaluate content of the plurality of socket buffers of the at least one first ring buffer to determine whether it contains header data or header data and payload data.

11. The apparatus of claim 10, wherein the processor is further configured to process data in the plurality of socket buffers of the at least one first ring buffer when it is determined that the plurality of socket buffers contain only header data.

12. The apparatus of claim 11, wherein the processor is configured to generate an indication in the at least one first ring buffer of the relative offsets of payload data in the at least one second ring buffer.

13. The apparatus of claim 11, wherein the processor is configured to process header data for a plurality of received packets, and to generate an indication to the buffer pool that a plurality of bytes are valid.

14. The apparatus of claim 10, wherein the processor is configured to copy one or more packets that are determined to be out of sequence to subsequent positions in the at least one second ring buffer when it is determined one or more of the plurality of socket buffers of the at least one first ring buffer contains header data and payload data.

15. The apparatus of claim 14, wherein the processor is configured to increment a next expected packet sequence number by a predetermined amount before proceeding to evaluate a next socket buffer in the first ring buffer.

16. The apparatus of claim 9, wherein the processor is configured to determine whether a packet is of a predetermined type of protocol, and when it is determined that the packet is of the predetermined type of protocol, truncate the packet to a standard length of the predetermined type of protocol.

17. One or more non-transitory computer readable storage media encoded with software comprising computer executable instructions that when executed are operable to:
at a network device, receive a plurality of packets of data, each packet comprising a header field and a payload field, wherein the plurality of packets of data includes at least one packet with a sequence number in the header field that is equal to an expected sequence number and at least one packet with a sequence number in the header field that is not equal to the expected sequence number;
evaluate data in the header field of a packet to determine whether the sequence number in the header field is equal to the expected sequence number for a given flow of packets;
based on the sequence number in the header field being equal to the expected sequence number,
store only header data from the header field in at least one header ring comprising a plurality of discrete socket buffers,
direct only payload data in a contiguous streamed manner to an application buffer pool, and
store, in at least one streaming data ring, pointers that point to buffers in the application buffer pool for corresponding payload data without copying the payload data in and out of memory in which the header data is stored; and
based on the sequence number in the header field being not equal to the expected sequence number, store both the header data and the payload data in the at least one header ring.

18. The non-transitory computer readable storage media of claim 17, and further comprising instructions that are operable to evaluate content of the at least one header ring to determine whether it contains header data or header data and payload data.

19. The non-transitory computer readable storage media of claim 18, and further comprising instructions that are operable to generate an indication in the at least one header ring of the relative offsets of the payload data referenced in the at least one streaming data ring.

20. The non-transitory computer readable storage media of claim 18, and further comprising instructions that are operable to, when it is determined that the at least one header ring contains header data and payload data, copy one or more packets that are determined to be out of sequence to subsequent positions in the at least one streaming data ring.

21. The non-transitory computer readable storage media of claim 20, and further comprising instructions that are operable to increment a next expected packet sequence number by a predetermined amount before evaluating a next socket buffer in the at least one header ring.

22. The non-transitory computer readable storage media of claim 18, when it is determined that the at least one header ring contains only header data, process the header data in the at least one header ring.

23. The non-transitory computer readable storage media of claim 18, wherein the header data is processed for a plurality of received packets, and further comprising instructions that are operable to generate an indication to the application buffer pool that a plurality of bytes are valid.

24. The non-transitory computer readable storage media of claim 17, and further comprising instructions that are operable to determine whether a packet is of a predetermined type of protocol, and when it is determined that the packet is of the predetermined type of protocol, truncate the packet to a standard length of the predetermined type of protocol.

* * * * *